United States Patent [19]
Yun

[11] Patent Number: 5,505,490
[45] Date of Patent: * Apr. 9, 1996

[54] FRAME UTILIZING THE VECTOR SYSTEM FOR VEHICLES

[76] Inventor: Jae S. Yun, 103 Cambridge La., Glendale Heights, Ill. 60139

[ * ] Notice: The portion of the term of this patent subsequent to Oct. 27, 2009, has been disclaimed.

[21] Appl. No.: 265,115

[22] Filed: Jun. 24, 1994

Related U.S. Application Data

[63] Continuation-in-part of Ser. No. 11,271, Jan. 29, 1993.

[51] Int. Cl.⁶ .................................................. B62D 21/11
[52] U.S. Cl. ............................................ 280/788; 280/723
[58] Field of Search ................................ 280/788, 723, 280/786, 261

[56] References Cited

U.S. PATENT DOCUMENTS

| | | | |
|---|---|---|---|
| D. 312,229 | 11/1990 | Yun | D12/111 |
| D. 330,353 | 10/1992 | Shin | D12/111 |
| D. 330,530 | 10/1992 | Yun | D12/159 |
| 2,228,732 | 1/1941 | Rabe | 280/786 |
| 4,337,953 | 7/1982 | Witt et al. | 280/723 |
| 4,995,627 | 2/1991 | Yun | 280/261 |
| 5,064,212 | 11/1991 | Yun | 280/261 |

*Primary Examiner*—Karin L. Tyson

[57] ABSTRACT

A vehicle frame which comprises at least one top beam, at least one front cross bar and a rear cross bar disposed on both ends of the at least one top beam, a pair of front and rear bent support assemblies disposed on both ends of the at least one cross bar, wherein the front and rear action-bar and reaction-bar are bent forwardly at a vectorial angle of about 90 degrees, respectively, and also depending on the purpose and function of the use action-bar and reaction-bar differ in length and in diagonally inclined angle, respectively, therefore the front and rear bent support assemblies are used to create component and resultant forces to be transformed to the forward moving kinetic energy for the vehicle.

7 Claims, 1 Drawing Sheet

1

FRAME UTILIZING THE VECTOR SYSTEM FOR VEHICLES

This is a continuation-in-part of application of U.S. patent application Ser. No. 08/011,271, filed Jan. 29, 1993.

BACKGROUND OF THE INVENTION

1. Field of the Invention

The present invention relates to a vehicle frame utilizing the vector system and more particularly, to a vehicle such as an automobile, van, bus, truck, or the like including a vehicle frame which has a top beam, a front cross bar, a rear cross bar with a reaction-arm, and a pair of front and rear bent action-bar and reaction-bar with wheel suspension respectively, and disposed so as to form an animal-bone system, wherein the vehicle frame is used for accelerating the forward moving speed of the vehicle since the weight on the vehicle is converted to kinetic energy which adds to the moving energy of the vehicle, whereby the vehicle may be driven with little effort being required by the vehicle driver.

2. Description of the Prior Art

Many typed of vehicles are known in the art which include a frame having a side rails, a front cross bar, and rear cross bar wherein the side rails are provided with a pair of front and rear wheel supports with are disposed vertically and are parallel to each other. However, the weight on the vehicle cannot by converted into kinetic energy since the weight merely adds to the gravity of the rear wheel of the vehicle so that such vehicles are driven with such effort being required by the vehicle driver.

In order to avoid such problem, U.S. Pat. No. Des. 312, 229; U.S. Pat. Nos. 4,995,627; 5,064,212; Des. 330,529; Des 330,530; and Des. 330,353 and pat. pending Ser. No. 08/001, 271 issued to the present inventor, discloses a combined bicycle frame and vehicle frame.

SUMMARY OF THE INVENTION

Accordingly, it is an object of the present invention to provide an improved vehicle frame for accelerating the forward moving speed of a vehicle including the vehicle frame.

Another object of the present invention is to provide a vehicle having an animal bone shaped configuration frame, which includes a pair of front and rear bent action-bar and reaction-bar with a wheel suspension support with the wheel. The front and rear weight directly away from each other and as the weight of a vehicle is set up, the inclination angle of the front pair of action-bars and the rear pair of reaction-arms is synchronized by a component, the front and rear weight, respectively. Whereas the inclined force with an acceleration force exert which is to be transformed into a forward moving kinetic energy on a vehicle.

A further object of the present invention is to provide a vehicle frame including a pair of front and rear bent action-bar and reaction-bar with wheel suspension support and with a forward bend at vectorial angles of 90 degrees, respectively. Whereby the weight force exert at the front and rear is pushed to each other, respectively, to a 90 degree positive bent supporter causing the resultant force exert at point of forward bend with action and reaction by the gravity and ground, thereof, the resultant force to be transformed into a forward moving kinetic energy for the vehicle.

When the weight of the body is accelerated on the ground, it is synchronized with a positive and negative vector. So that, the positive vector is in the same direction and parallel to each pair of front and rear action-bar; the negative vector is in the same direction and parallel to each pair of front and rear reaction-bar and a reaction-arm, respectively. Also, a 45 degree to a 60 degree inclined angle of the positive action-bar and 45 degree to 60 degree inclined negative reaction-bar and reaction-arm depending on the purpose and function of the use. Whereas, the action-bar, reaction-bar, and reaction-arm length is influenced by a 45 degree to 60 degree positive and negative inclined angle. Thus, the inclined action-bar and reaction-bar are maintains a vectorial angle of 90 degrees, being a vertical joint of the top portion of the action-bar, respectively.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

Briefly described, the present invention relates to a vehicle frame which comprises at least one top beam, at least one cross bar and a rear cross bar disposed on both ends, at least one top beam, a pair of front and rear bent support assemblies with reaction-arm disposed on both ends of at least one cross bar, wherein the action-bar and reaction-bar are bent forwardly, respectively. Thereof, the suspension assemblies extend from the reaction-bar ends of each front and rear suspension supports assemblies to the vehicle wheels, respectively, and the inclined action-bar and reaction-bar are maintained a vectorial angle of 90 degrees, respectively. Also, the 45 degree to 60 degree inclined angle of the positive action-bar and 45 degree to 60 degree inclined negative reaction-bar depending on the purpose and function of the use. Whereas, the action-bar and reaction-bar length is influenced by a 45 degree to 60 degree positive and negative inclined angle, whereby the front and rear bent supports assembly are used to create component and resultant forces to be transferred to the forward moving kinetic energy for the vehicle.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENTS

Figure 1:
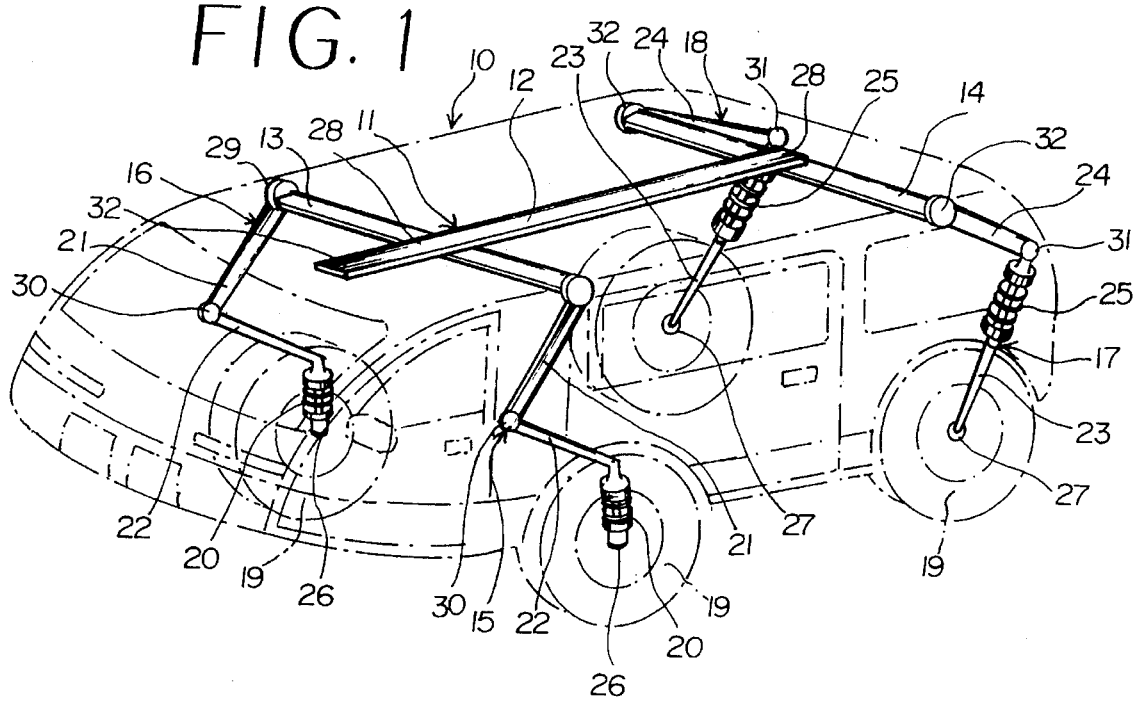
FIG. 1 is a perspective view of a vehicle having a frame which includes a top beam, a front cross bar, a rear cross bar, a pair of front and rear bent action-bar and reaction-bar with wheel supports assemblies of the present invention.
Figure 2:
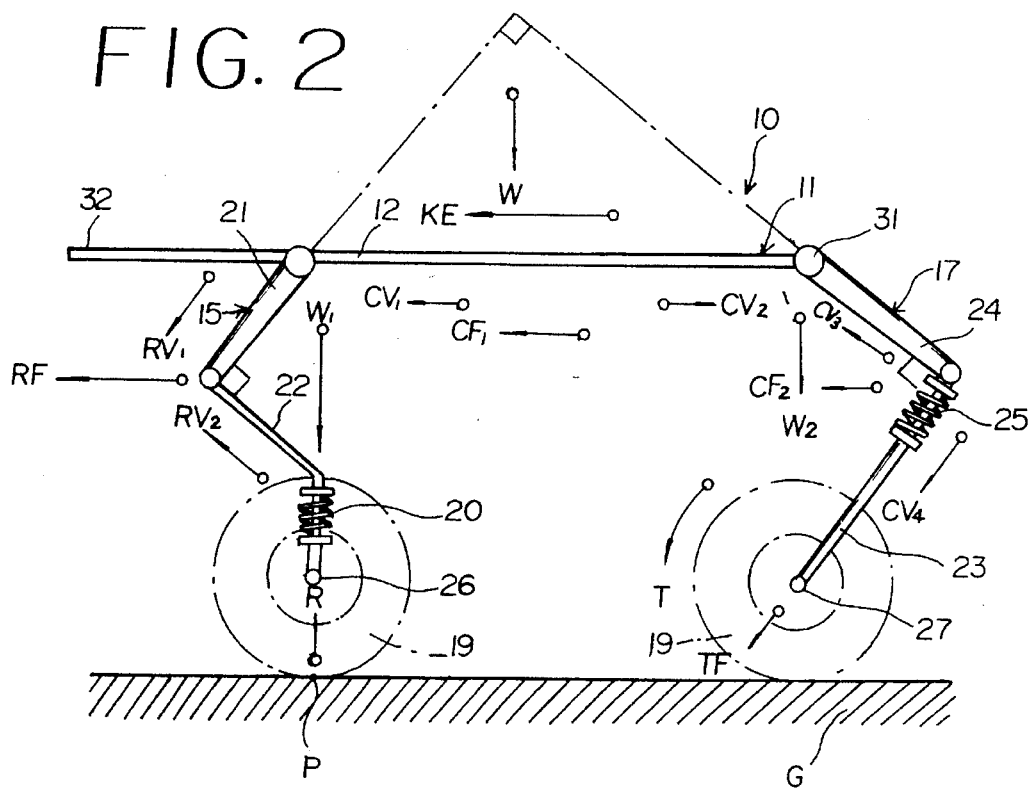
FIG. 2 is a somewhat diagrammatic side view of the vehicle frame showing a top beam with a reaction arm, a front and rear bent action-bar and reaction-bar with wheel vertical suspension-bar support assembly of the present invention and showing the resultant and component forces of forward moving kinetic energy for the vehicle frame.

Referring now in detail to the drawings for the purpose of illustrating preferred embodiments of the present invention, the vehicle body 10 as shown in FIGS. 1 and 2 comprises a vehicle frame 11 including a top beam 12, a front cross bar 13 connected to a front joint portion 28 of the top beam 12, and a rear cross bar 14 connected to a rear joint portion 28 of the top beam 12, a pair of front bent assembly supports 15 and 16, a pair of reaction arms 25, and supported by a pair of rear bent assemblies 17 and 18, supports the rear cross bar 14 at the joint portion 32. The action-bar 21 connected as a disposed bent to the reactions-bar 22 which is supported by the vertical suspension 20. Together with the steering knuckle with the wheel spindle assembly 26, and front wheel, left and right 19, construct the front bent support assemblies 15 and 16, respectively. The joint potion of the front cross bar 13 to the front bent support assemblies, 15 and 16, maintain an imaginary vertical line with the vertical suspension assemble 20, the front bent support assembles. Another disposed bent action-bar 23 and reaction-bar 24 are supported by the vertical suspension 20 in turn is supported by the wheel spindle assemblies 27. Together with the rear wheel, left and right 19, construct the rear bent support assemblies 17 and 18. The joint portion of the rear cross bar 14 to the rear bent support assemblies 17 and 18 maintain an imaginary vertical line with the vertical suspension assembly 20, the rear bent support assemblies.

The top beam 12 extends a forward end 32 from the front joint portion 28. The top beam 12 and forward end 32 and front and rear cross bars 13 and 14 are disposed in a ceiling of the vehicle body 10.

The front bent support assemblies 15 and 16 includes action-bar 21 and a reaction-bar 22 which maintains a 90 degree angle at the joint portion 30. Both right and left action bars 21 are parallel and equal lengths to each other; both right and left reaction bars 22 are parallel and equal lengths to each other. The inclination of the action bars 21 influences the length of the action bars 21 and reaction bars 22. The rear bent support assembly 17 includes an action-bar 23 and a reaction-bar 24 which maintains a 90 degree angle at the joint portions 31. Both right and left action bars 23 are parallel and equal lengths to each other. The inclination of the action bars 23 influences the length of the action bars 23 and reaction bars 24. The front action bars 21 are parallel to the rear action bars 23; the front reaction bars 22 are parallel to the rear action bars 24. As shown in FIG. 2, the configuration of the vectorial angles at a 90 degree are the front bent action-bar 21 and reaction-bar 22, rear bent action-bar 23 and reaction bar 24, and the intersection of imaginary extended lines of the front action-bar 21 and the rear reaction-bar 24. Thus, the front and rear action-bar 21 and 23, and reaction-bar 22 are parallel and in the same direction, respectively. The action bar 21 and 23, and reaction-bar 22 and 24 have different lengths and diagonal angle depending on the purpose and function of the vehicle.

Also in FIG. 2, the body of the weight W10 is synchronized by the component front weight W1 to the action-bar 21 and rear weight W2 to the rear reaction-bar 24, respectively. Simultaneously, the front bent assembly 15 is an action vector arrow AV on the action-bar 21 with an reaction vector arrow RV on the reaction-bar 22. The reaction arrow RV with a reaction-bar 26 starting a point P through the wheel 19 and suspension assembly 20. Therefore, this creates a resultant force RF, respectively.

And, the rear bent assembly 17 is an action vector arrow AV on the action-bar 23 with an reaction vector arrow RV on the reaction-bar 24. The reaction arrow RV with a reaction-bar 24 starting a point P through the wheel 19 and suspension assembly 20. Therefore, this creates a resultant force RF1, respectively.

The top beam 12 has a pulling arrow of resultant force RF by the function of the front bent support assembly 15 and another pushing arrow of reaction-arm 25. Therefore, the pushing arrow of the resultant force RF by the function of the rear bent support assembly, so as to be transformed to a forward moving kinetic energy for the vehicle body 10.

FIGS. 1 and 2 shows the vehicle body 10 with a body frame 11 is being pushed forward from the top beam 12 which is pulling and pushing the front and rear bar 13 and 14 causing the front resultant vector RF functioning by a pair of front bent support assemblies 15 and 16 and rear resultant vector RF1 and functioning by a pair of rear bent support assemblies 17 and 18 with a reaction-arm 25, respectively.

Accordingly, the vehicle body 10 utilizing the vector system of the present invention any be driven by the driver with less effort being required by the vehicle engine when compared with conventional vehicles.

What is claimed is:

1. A vehicle having a vehicle body, a pair of front wheels and a pair of rear wheels, which includes a vehicle frame comprising:

a top beam including a front joint portion and a rear joint portion, a front cross bar having a central portion connected to the top beam rearwardly of a foremost portion of the top beam, a pair of front bent support assemblies, one of the front bent support assemblies pivotally mounted on each end of the front cross bar, the pair of front bent support assemblies each including a front action bar and a front reaction bar which are joined together at a 90 degree angle, a rear cross bar having a central portion connected to the top beam at a rear end of the top beam, a pair of rear bent support assemblies one of the rear bent support assemblies pivotally mounted on each end of the rear cross bar, and the pair of rear bent support assemblies each including a rear reaction bar and rear action bar which are joined together at a 90 degree angle with the rear reaction bar being shorter than the rear action bar.

2. The vehicle of claim 1, wherein the vehicle has a ceiling and said top beam is attached to the ceiling of the vehicle.

3. The vehicle of claim 2, wherein the pair of front action bars are angled downwardly and forwardly in a 45–60 measured angle from a horizontal plane and have the same length.

4. The vehicle of claim 3, wherein the pair of front reaction bars are angled rearwardly at a 45–60 angle from a horizontal plane and have the same length.

5. The vehicle of claim 2, wherein the pair of rear reaction bars are angled rearwardly at a 45–60 angle with respect to a horizontal plane and have the same length.

6. The vehicle of claim 5, wherein the pair of rear action bars are angled forwardly at a 45–60 angle with respect to a horizontal plane and have the same length.

7. The vehicle of claim 1, wherein the pair of front bent support assemblies support the weight of the front part of the vehicle upon the ground.

* * * * *